United States Patent
Floc'h

(10) Patent No.: US 10,704,757 B2
(45) Date of Patent: Jul. 7, 2020

(54) LIGHTING UNIT FOR AUTOMOTIVE HEADLAMP

(71) Applicant: Valeo North America, Inc., Troy, MI (US)

(72) Inventor: Lionel Floc'h, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 16/164,918

(22) Filed: Oct. 19, 2018

(65) Prior Publication Data

US 2020/0124243 A1  Apr. 23, 2020

(51) Int. Cl.
| | |
|---|---|
| *F21S 41/36* | (2018.01) |
| *F21S 43/31* | (2018.01) |
| *F21S 43/14* | (2018.01) |
| *F21S 41/147* | (2018.01) |
| *F21Y 113/13* | (2016.01) |

(52) U.S. Cl.
CPC ............ *F21S 41/36* (2018.01); *F21S 41/147* (2018.01); *F21S 43/14* (2018.01); *F21S 43/31* (2018.01); *F21Y 2113/13* (2016.08)

(58) Field of Classification Search
CPC .. F21S 41/141–153; F21S 43/14; F21S 43/30; F21Y 2113/13; F21K 9/68; F21V 7/0083
See application file for complete search history.

(56) References Cited

U.S. PATENT DOCUMENTS

| | | | | |
|---|---|---|---|---|
| 2005/0094393 | A1* | 5/2005 | Czajkowski | F21S 4/28 362/247 |
| 2008/0204888 | A1* | 8/2008 | Kan | F21S 8/026 359/629 |
| 2013/0003363 | A1* | 1/2013 | Lu | G02B 19/0066 362/217.02 |
| 2015/0369435 | A1* | 12/2015 | Bauer | H05K 1/0295 362/545 |
| 2019/0110348 | A1* | 4/2019 | Feil | F21S 43/14 |

FOREIGN PATENT DOCUMENTS

| | | |
|---|---|---|
| DE | 10 2010 056 312 A1 | 6/2012 |
| EP | 2 161 494 B1 | 11/2011 |

* cited by examiner

*Primary Examiner* — Mariceli Santiago
(74) *Attorney, Agent, or Firm* — Valeo North America, Inc.

(57) ABSTRACT

The present invention relates to a lighting unit of an automotive headlamp comprising: a series of two or more reflectors arranged side by side and coincident with each other; at least two light sources are arranged per reflector and disposed such that each light source provides light rays to the reflector targeted immediately adjacent to a focal point of the corresponding reflector and on opposing sides of the focal point; and the at least two light sources for each reflector are rotationally arranged at a set positional angle relative to the at least two light sources of the coincident reflector to produce a centered output beam.

12 Claims, 6 Drawing Sheets

LIGHTING UNIT FOR AUTOMOTIVE HEADLAMP

BACKGROUND OF THE INVENTION

Field of the Invention

The present invention relates to a lighting device, and more particularly, to a lighting device for a motor vehicle having a plurality of light sources for performing various lighting/signaling functions.

Description of the Related Art

Known lighting devices or headlamps assemblies for automotive vehicles are equipped with plurality of light sources operated to perform various lighting/signalling functions. To fulfill several lighting/signalling functions, the lighting devices have light sources, for example light emitting diodes (LEDs) that can emit light in different colors. The light sources may be arranged adjacent to or spaced apart from each other such that a substantial space for accommodating the light sources is required in the lighting device. The lighting device can also include a reflector module for collimating the light emitted from the light sources. The light sources are typically arranged in a manner such that the light emitted are pointed directly at a focal point of the reflectors of the reflector module.

FIG. 1A shows an arrangement of plurality of light sources and a reflector assembly of a lighting unit, in accordance with prior art. As can be seen from the FIG. 1A, the reflector assembly 100 includes two reflectors 105, and light sources include white (W) and amber (A) LEDs arranged adjacent to each other on a Printed Circuit Board (PCB) 110. In this example, white LEDs are positioned such that the light emitted is directed to a focal point and used to generate a first light distribution. The amber LEDs are are positioned such that the light emitted is directed near the focal point and used to generate a second light distribution, which differs in color from the first light distribution with slightly less efficiency. With this arrangement, the resulting beam pattern 115 emitted from each LED is decentered as a result of beam shifts, as shown in the FIG. 1B. This results in reduced overall efficiency of the lighting device.

Further, with the present arrangement of the light sources, it can be seen from the FIG. 1B that there is a lack of light on a part of illuminated area depending on the position of LEDs on the PCB 110. Therefore, the regulation requirements of distribution of light can not be fulfilled with the present arrangement of the light sources on the PCB 110. The invention herein overcomes one or more of the problems of the known lighting devices.

SUMMARY OF THE INVENTION

An object of the present invention is to solve the above described disadvantages of known lighting devices. In particular, an object of the present invention is to provide a lighting unit/device that can perform various lighting/signalling functions while generating a centered output beam, and more preferably a centered output beam that balances the efficiency of both lighting/signaling functions.

Another object of the present invention is to provide a lighting device that can generate a centered output beam while meeting the regulation requirements.

To achieve at least the above mentioned objects, there is provided a lighting unit for an automotive headlamp, in accordance with an embodiment of the present invention. The lighting unit comprises a series of two or more reflectors arranged side by side and coincident with each other; and at least two light sources are arranged per reflector and disposed such that each light source provides light rays to the reflector targeted immediately adjacent to a focal point of the corresponding reflector and on opposing sides of the focal point. Further, the at least two light sources for each reflector are rotationally arranged at a set positional angle relative to the at least two light sources of the coincident reflector.

In an aspect, the at least two light sources include at least one first light source for providing a first lighting function and at least one second light source for providing a second lighting function. In an aspect, the at least one first light source is Amber Light Emitting Diode (LED) and the at least one second light source is white LED. The first lighting function is embodied as a daytime driving light, as a position light, or both and the second lighting function is embodied as a flash lighting for the indication of the driving direction of a vehicle.

In an embodiment, the lighting unit further comprises a control unit to control the various functions. For example, the control unit is an electronic circuit to control the operation of the light sources.

In an embodiment, the set positional angle is about equal to 360 degrees divided by the number of reflectors.

In an embodiment, the set position angle is at least about 45 degrees. In another embodiment, the set position angle is at least about 180 degrees. Yet, in another embodiment, the set position angle is at least about 90 degrees. Still in another embodiment, the set position angle is at least about 120 degrees.

In an embodiment, the at least two reflectors are parabolic reflectors, which are similar in shape, size, and made of the same material.

In accordance with a preferred embodiment of the present invention, the lighting unit comprises a series of four reflectors arranged side by side and coincident with each other; and at least two light sources are arranged per reflector and disposed such that each light source provides light rays to the reflector targeted immediately adjacent to a focal point of the corresponding reflector and on opposing sides of the focal point. Further, the at least two light sources for each reflector are rotationally arranged at a set positional angle relative to the at least two light sources of the coincident reflector. In an embodiment, the set position angle is about 90 degrees. In another embodiment, the set position angle is about 180 degrees. Yet, in another embodiment, the set position angle is between 45 degrees and 180 degrees. Still, in another embodiment, the set position angle is about 45 degrees.

In accordance with another embodiment of the present invention, the lighting unit comprises a series of four parabolic reflectors arranged side by side and coincident with each other; and at least two light sources are arranged per parabolic reflector and disposed such that each light source provides light rays to the reflector targeted immediately adjacent to a focal point of the corresponding reflector and on opposing sides of the focal point. Further, the at least two light sources for each reflector are rotationally arranged at a set positional angle relative to the at least two light sources of the coincident parabolic reflector, further wherein the set positional angle is between 60 and 120 degrees.

The lighting unit of the present invention can perform various lighting/signalling functions while generating a centered output beam. Therefore, the overall efficiency of the lighting unit is improved in accordance with the present invention.

These and other objects and advantages of the invention will be apparent from the following description, the accompanying drawings and the appended claims.

DETAILED DESCRIPTION OF THE DRAWINGS

The embodiments of the present invention will be further explained below with reference to the figures and examples. Throughout the description, the same or similar reference numbers indicate the same or similar members. The following embodiments along with the figures are only used to explain the general concept of the present invention, instead of being intended to limit the scope of the present invention.

The present invention relates to a lighting unit of an automotive headlamp that can perform various lighting/signalling functions while generating a centered output beam. Specifically, in the present subject matter, the plurality of light sources of the lighting unit are arranged in a specific manner such that each light source can produce a centered output beam, thereby the overall efficiency of the lighting unit can be improved while meeting the regulation requirements.

Generally, the lighting unit for the automotive headlamp comprises one or more light sources, a reflector assembly, a lens, and housing. The lighting unit of the headlamp is configured to perform various lighting/signaling functions, for example, daytime running light function, a turn signal function etc. To perform different lighting/signaling functions, the lighting unit may be equipped with LEDs that can emit different colors. To fulfill the functions, the LEDs may operate either in groups or operate simultaneously. Further, the LEDs may be arranged in groups to fulfil several functions.

According to one embodiment of the present invention, a lighting unit of an automotive headlamp comprising: a series of two or more reflectors arranged side by side and coincident with each other; at least two light sources are arranged per reflector and disposed such that each light source provides light rays to the reflector targeted immediately adjacent to a focal point of the corresponding reflector and on opposing sides of the focal point; and the at least two light sources for each reflector are rotationally arranged at a set positional angle relative to the at least two light sources of the coincident reflector.

Figure 2A:
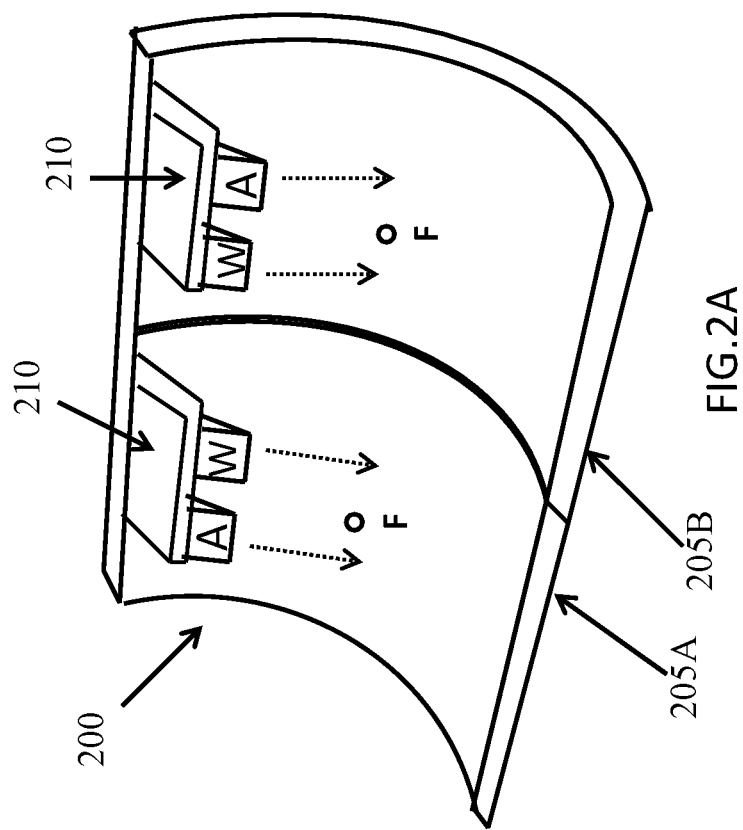
FIG. 2A shows an arrangement of a plurality of light sources and a reflector assembly of a lighting unit, in accordance with an embodiment of the present invention.

As an illustrative example as FIG. 2A shows, an arrangement of the plurality of light sources and a reflector assembly of a lighting unit, in accordance with an embodiment of the present invention. As can be seen from the FIG. 2A, the reflector assembly 200 includes a series of two reflectors 205A, 205B arranged side by side and coincident with each other. For the purpose of brevity, two reflectors 205A, 205B are shown in the FIG. 2A. It is understood to a person skilled in the art that more than two reflectors can be incorporated into the lighting unit, without any limitation. In an aspect, the at least two reflectors 205A, 205B are parabolic reflectors, which are similar in size, shape and made from the same material.

As can also be seen from the FIG. 2A, two light sources (A,W) are arranged per reflector 205A, 205B for performing two functions. It should be noted that, more than two light sources can also be arranged per each reflector for performing multiple functions. The two light sources arranged per reflector comprises a white LED and an amber LED for performing a first function and a second function, respectively. LEDs of the first function are indicated by 'A', and the LEDs of the second function are indicated by 'W'. If the function position light and/or daytime running lights required, the LEDs associated with the second function can be operated; and if a flashing function is required for a direction indicator, the LEDs associated with the first function can be operated.

Figure 2B:
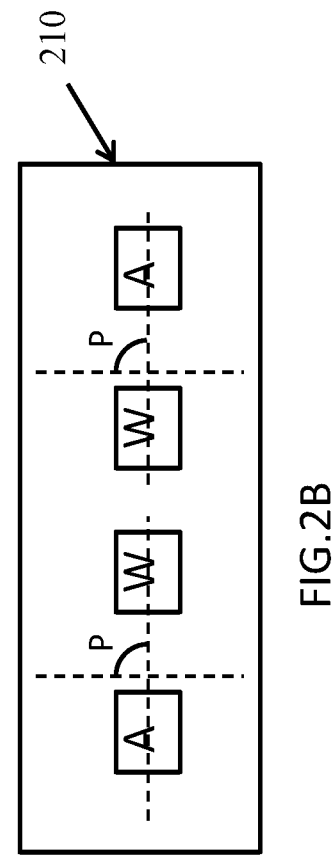
FIG. 2B shows a top view of the configuration of light sources, shown in the FIG. 2A, mounted on a light source mounting structure, in accordance with an embodiment of the present invention.

In an aspect, the at least two light sources of the lighting unit are arranged on a light source mounting structure 210. For example, the light source mounting structure 210 is a Printed Circuit Board (PCB) 210. The arrangement of the light sources on the PCB 210, in accordance with an embodiment of the present invention, is shown in the FIG. 2B. In particular, the FIG. 2B shows a top view of the arrangement of the light sources (A, W) on the PCB 210. As can be seen from the FIG. 2B, the light sources (A, W) are arranged alternately adjacent to each other on the PCB 210.

In an embodiment, the at least two light sources (A, W) for each reflector 205A are rotationally arranged at a set positional angle relative to the at least two light sources (A,W) of the coincident reflector 205B. As can be seen from the FIG. 2B, the at least two light sources for each reflector 205A are arranged at an angle P relative to the at least two light sources of the coincident reflector 205B.

In an embodiment, the set positional angle is about equal to 360 degrees divided by the number of reflectors. As can be seen from the FIG. 2B, the set position angle is about 180 degrees. In the FIG. 2B, the at least two light sources for each reflector 205A are arranged at 180 degrees relative to the at least two light sources of the coincident reflector 205B such that the light sources are arranged alternately adjacent to each other on the PCB 210. As can be seen from the FIG. 2B, a white LED arranged for a first reflector 205A is adjacent to a white LED arranged for a second reflector 205B. Likewise, an amber LED arranged for a second reflector is adjacent to an amber LED arranged for a third reflector and so on.

Further, it can be seen from the FIG. 2A that the light sources (A, W) are disposed such that each light source provides light rays to the reflector targeted immediately adjacent to a focal point (F) of the corresponding reflector and on opposing sides of the focal point (F).

Figure 1A:
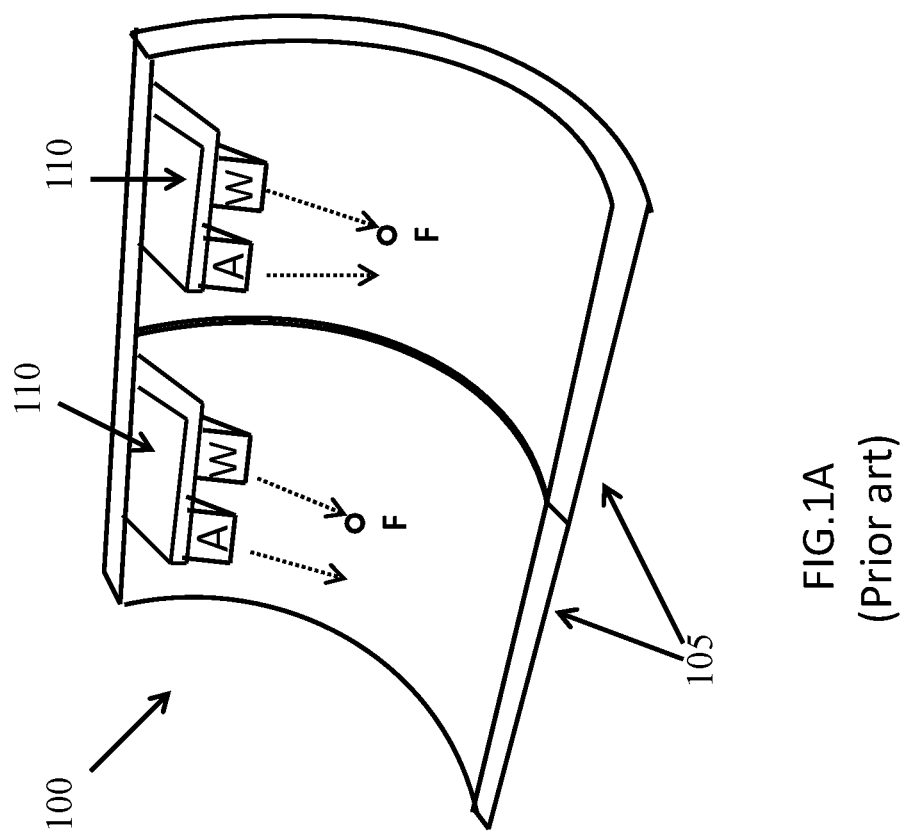
FIG. 1A shows an arrangement of plurality of light sources and a reflector assembly of a lighting unit, in accordance with prior art.
Figure 1B:
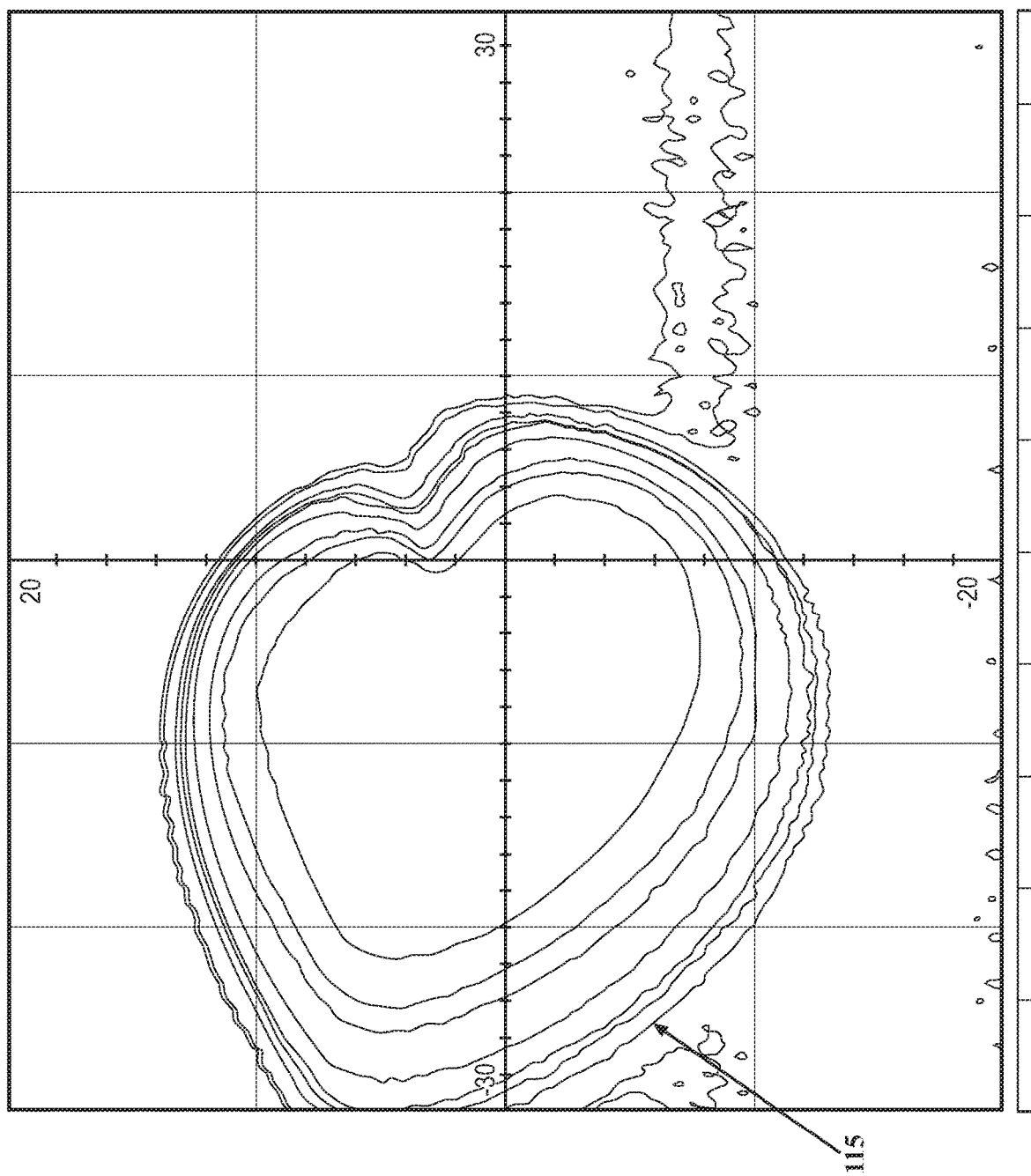
FIG. 1B shows a beam pattern of the lighting unit having the reflector assembly shown in the FIG. 1A.
Figure 2C:
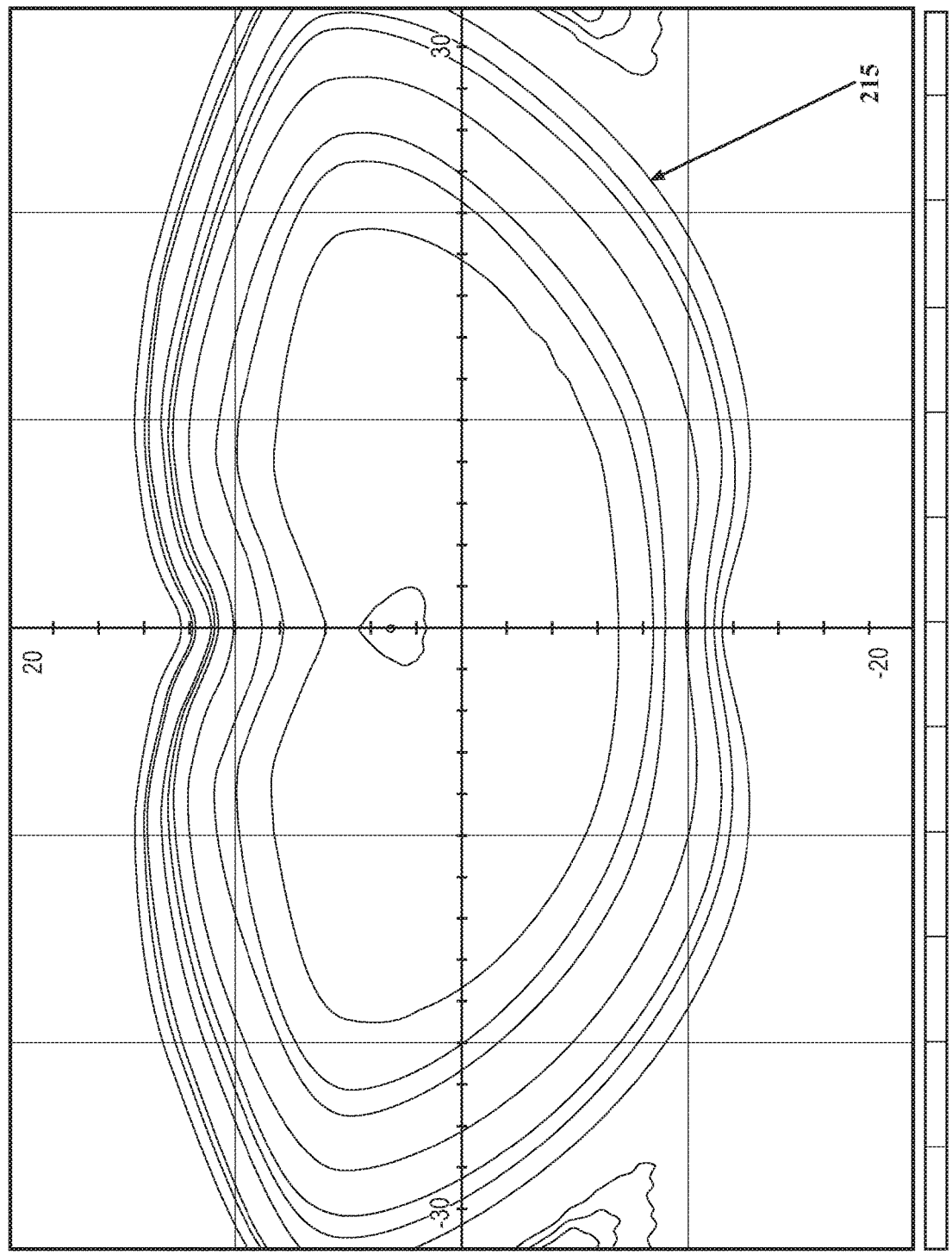
FIG. 2C shows a beam pattern of the lighting unit having the reflector assembly shown in the FIG. 2A, in accordance with an embodiment of the present invention.

By arranging the LEDs in the specific configuration shown in the FIG. 2A, each LED can generate a centered output beam. FIG. 2C shows a beam pattern of the lighting unit having the reflector assembly shown in the FIG. 2A, in accordance with an embodiment of the present invention. As can be seen from the FIG. 2C, the beam pattern 215 is more centered compared to the beam pattern shown in the FIG. 1B (prior art). Further, it can also be observed from the FIG. 2C is that the beam pattern is spread throughout the illuminated area. Therefore, the efficiency of the lighting unit can be improved by arranging the LEDs in accordance with the FIG. 2B.

Figure 3A:
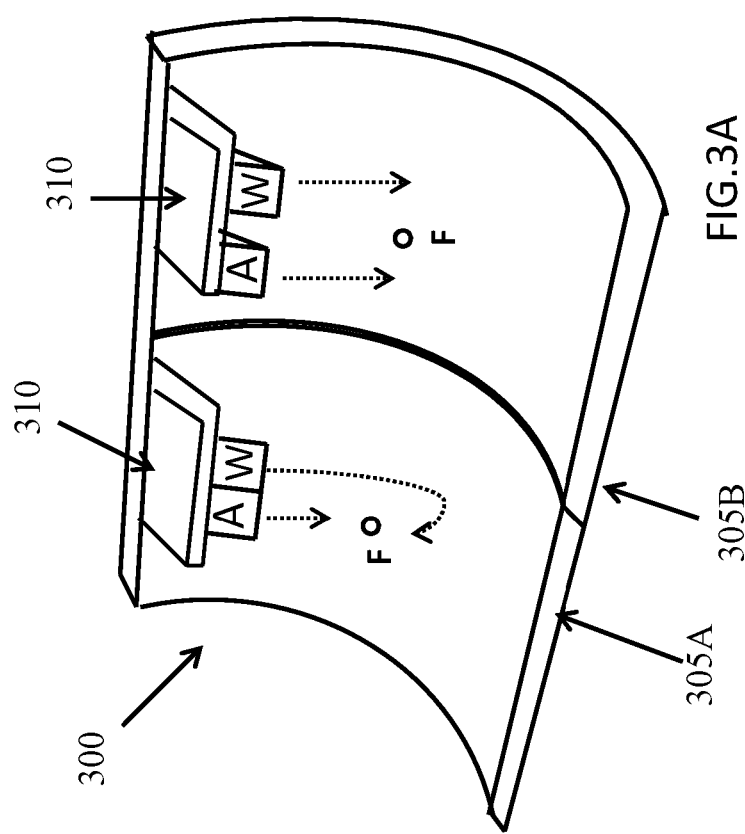
FIG. 3A shows an arrangement of a plurality of light sources and a reflector assembly of a lighting unit, in accordance with a preferred embodiment of the present invention.
Figure 3B:
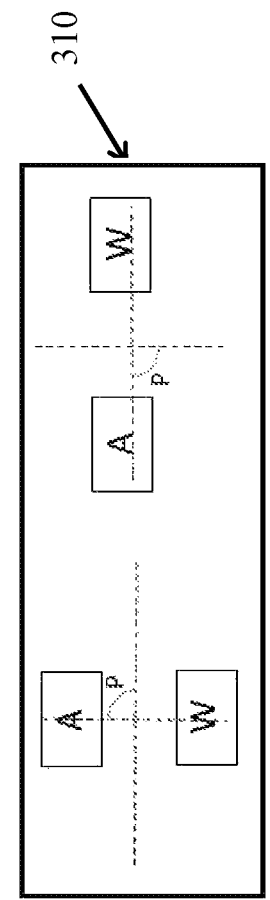
FIG. 3B shows a top view of the configuration of light sources, shown in the FIG. 3A, mounted on a light source mounting structure, in accordance with a preferred embodiment of the present invention.
Figure 3C:
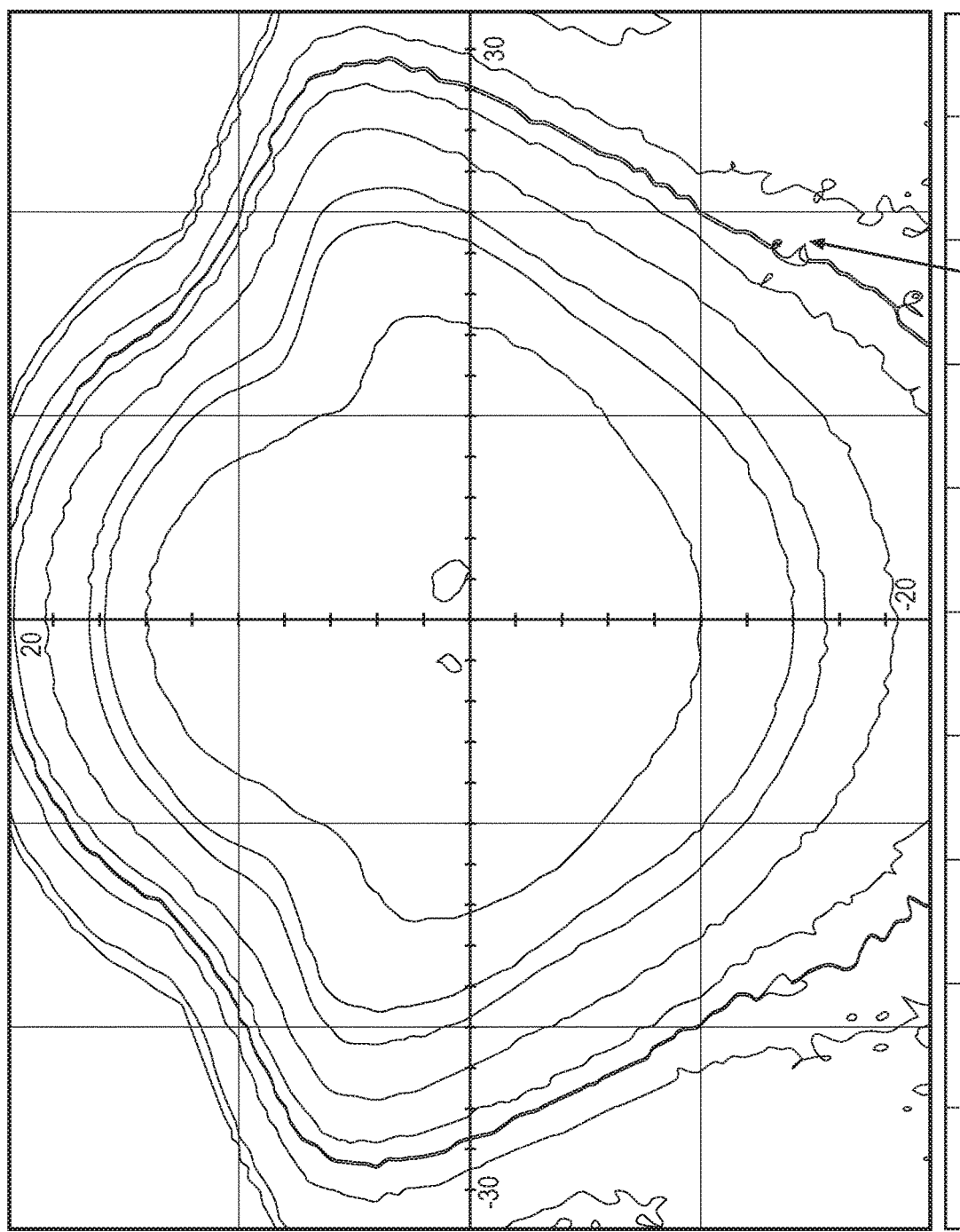
FIG. 3C shows a beam pattern of the lighting unit having the reflector assembly shown in the FIG. 3A, in accordance with an embodiment of the present invention.

In another embodiment of the present invention, the light sources are arranged in a different manner to achieve a centered output beam. In accordance with a preferred embodiment of the present invention, the light sources are arranged in a different manner to achieve a centered output beam. In this preferred embodiment, the reflector assembly of the lighting unit includes four reflectors. FIG. 3A shows an arrangement of a plurality of light sources and a reflector assembly of a lighting unit, in accordance with a preferred embodiment of the present invention. FIG. 3B shows a top view of the configuration of light sources, shown in the FIG. 3A, mounted on a light source mounting structure 310, in accordance with a preferred embodiment of the present invention. FIG. 3C shows a beam pattern of the lighting unit having the reflector assembly shown in the FIG. 3A, in accordance with an embodiment of the present invention.

As can be seen from the FIG. 3A, the lighting unit in accordance with the preferred embodiment comprises a reflector assembly 300 having a series of four reflectors 305A, 305B, 305C, 305D arranged side by side and coincident with each other; and at least two light sources (A,W) are arranged per reflector and disposed such that each light source provides light rays to the reflector targeted immediately adjacent to a focal point (F) of the corresponding reflector and on opposing sides of the focal point. Further, the at least two light sources for each reflector are rotationally arranged at a set positional angle P relative to the at least two light sources of the coincident reflector. As mentioned previously, the set position angle is about equal to 360 degrees divided by the number of reflectors. As can be seen from the FIG. 3B, the set position angle is about 90 degrees as the reflector assembly includes four reflectors.

In an embodiment, the set position angle is at least about 45 degrees if the number of reflectors in the reflector assembly are equal to 8. In another embodiment, the set position angle is about 60 degrees if the number of reflectors in the reflector assembly are equal to 6. Yet, in another embodiment, the set position angle is about at least 120 degrees if the number of reflectors in the reflector assembly are equal to 3.

FIG. 3C shows a beam pattern of the lighting unit having the reflector assembly shown in the FIG. 3A, in accordance with an embodiment of the present invention. As can be seen from the FIG. 3C, the beam pattern 315 is more centered compared to the beam pattern 115 shown in the FIG. 1B (prior art) and the beam pattern 215 shown in the FIG. 2B.

By arranging the LEDs in the specific configuration shown in the FIG. 2B, and FIG. 3B, each LED can generate a centered output beam, and thereby the efficiency of the lighting unit is improved.

Further, in an embodiment, the present invention includes a control unit (not shown in the Figures) to control the operation of various LEDs to perform various functions. For instance, the control unit is an electronic circuit to control the operations of the light sources.

The present invention is not limited in its implementation to the above described embodiments. Rather, a number of variants which make use of the described solution even for basically different configurations. More particularly, the present invention is not limited to the embodiments of the lighting unit as a frontal head of the motor vehicle. The present invention is also directed to lighting units that serve as a tail light of the motor vehicle.

Although the present disclosure is provided with reference to figures, all of the embodiments shown in figures are intended to explain the preferred embodiments of the present invention by way of examples, instead of being intended to limit the present invention.

Apparently, it would be appreciated by those skilled in the art that various changes or modifications may be made in the present disclosure without departing from the principles and spirit of the disclosure, which are intended to be covered by the present invention as long as these changes or modifications fall within the scope defined in the claims and their equivalents.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications are incorporated by reference for all purposes.

The term "consisting essentially" of to describe a combination shall include the elements, ingredients, components or steps identified, and such other elements ingredients, components or steps that do not materially affect the basic and novel characteristics of the combination.

The use of the terms "comprising" or "including" to describe combinations of elements, ingredients, components or steps herein also contemplates embodiments that consist essentially of the elements, ingredients, components or steps.

I claim:

1. A lighting unit of an automotive headlamp comprising:
   a series of two or more reflectors arranged side by side and coincident with each other;
   at least two light sources are arranged per reflector and disposed such that each light source provides light rays to the reflector targeted immediately adjacent to a focal point of the corresponding reflector and on opposing sides of the focal point; and wherein the at least two light sources for each reflector are rotationally arranged at a set positional angle relative to the at least two light sources of the coincident reflector.

2. The lighting unit according to claim 1, wherein the at least two light sources include at least one first light source for providing a first lighting function and at least one second light source for providing a second lighting function.

3. The lighting unit according to claim 1, wherein the set positional angle is about equal to 360 degrees divided by the number of reflectors.

4. The lighting unit according to claim 1, wherein the set positional angle is at least about 180 degrees.

5. The lighting unit according to claim 1, wherein the light source comprises a mounting structure that is a printed circuit board (PCB).

6. The lighting unit according to claim 2, wherein the at least one first light source is Amber Light Emitting Diodes (LED) and the at least one second light source is white light LED.

7. The lighting unit according to claim 2, wherein the first lighting function is embodied as a daytime driving light, as a position light, or both and the second lighting function is embodied as a flash lighting for the indication of the driving direction of a vehicle.

8. The lighting unit according to claim 1, wherein the lighting unit further comprises a control unit to control the various functions.

9. The lighting unit according to claim 1, wherein the at least two reflectors are parabolic reflectors.

10. A lighting unit of an automotive headlamp comprising:
    a series of four reflectors arranged side by side and coincident with each other;
    at least two light sources are arranged per reflector and disposed such that each light source provides light rays to the reflector targeted immediately adjacent to a focal point of the corresponding reflector and on opposing sides of the focal point; and
    wherein the at least two light sources for each reflector are rotationally arranged at a set positional angle relative to the at least two light sources of the coincident reflector.

11. A lighting unit of an automotive headlamp comprising:
    a series of four parabolic reflectors arranged side by side and coincident with each other;
    at least two light sources are arranged per parabolic reflector and disposed such that each light source provides light rays to the reflector targeted immediately adjacent to a focal point of the corresponding reflector and on opposing sides of the focal point; and
    wherein the at least two light sources for each reflector are rotationally arranged at a set positional angle relative to the at least two light sources of the coincident parabolic reflector, further wherein the set positional angle is between 60 and 120 degrees.

12. The lighting unit according to claim 11, wherein the set positional angle is about equal to 360 degrees divided by the number of reflectors.

\* \* \* \* \*